United States Patent
Ben-Eli et al.

(10) Patent No.: US 7,054,299 B2
(45) Date of Patent: May 30, 2006

(54) METHOD AND APPARATUS OF PILOT SIGNAL SYNCHRONIZATION VERIFIER

(75) Inventors: David Ben-Eli, Modiin (IL); Rony Ashkenazi, Kidron (IL)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 09/983,776

(22) Filed: Oct. 25, 2001

(65) Prior Publication Data
US 2003/0081633 A1    May 1, 2003

(51) Int. Cl.
*H04B 7/216* (2006.01)

(52) U.S. Cl. ............... 370/342; 370/328; 370/335; 370/503; 370/509; 370/510; 370/512; 370/513; 370/514; 370/350; 375/368; 375/340; 375/343; 375/354; 375/267; 375/347; 375/362

(58) Field of Classification Search ........... 375/368, 375/340, 362–366, 343; 455/132; 370/342
See application file for complete search history.

(56) References Cited

U.S. PATENT DOCUMENTS

| | | | |
|---|---|---|---|
| 6,144,691 A | 11/2000 | Kenney | |
| 6,222,874 B1 | 4/2001 | Walley et al. | |
| 6,334,047 B1 * | 12/2001 | Andersson et al. | 455/69 |
| 6,424,673 B1 * | 7/2002 | Chen et al. | 375/149 |
| 6,594,320 B1 * | 7/2003 | Sayeed | 375/281 |
| 2002/0009128 A1 * | 1/2002 | Ito | 375/147 |
| 2002/0145969 A1 * | 10/2002 | Sayeed | 370/206 |

OTHER PUBLICATIONS

Higuchi, et al., "Experimental Evaluation of 3-Step Cell Search Method in W-CDMA Mobile Radio", IEEE 2000, pp. 303-307.
Wang, et al., "Cell Search in W-CDMA", IEEE Journal on Selected Areas in Communications, vol. 18, No. 8, pp. 1470-1482, Aug. 2000.
Higuchi, et al., "Fast Cell Search Algorithm in Inter-Cell Asynchronous DS-CDMA Mobile Radio", IEICE Trans. Commun., vol. E81-B, No. 7, pp. 1527-1534, Jul. 1998.
www.hyperphisics.phy-astr.gsu.edu (printed Oct. 25, 2001), "Magnetic Properties of Solids" (2 pages).
www.hyperphisics.phy-astr.gsu.edu (printed Oct. 25, 2001), "Ferromagnetism" (4 pages).

* cited by examiner

*Primary Examiner*—Chi Pham
*Assistant Examiner*—Chrsitopher Grey
(74) *Attorney, Agent, or Firm*—Pearl Cohen Zedek Latzer LLP

(57) ABSTRACT

Briefly, in accordance with one embodiment of the invention, a verifier and a method for verifying synchronization of at least one pilot signal pattern of a wireless communication system are disclosed. A method and a module of frequency acquisition are also disclosed.

23 Claims, 5 Drawing Sheets

METHOD AND APPARATUS OF PILOT SIGNAL SYNCHRONIZATION VERIFIER

BACKGROUND OF THE INVENTION

In wireless communication systems such as third generation (3G) cellular communication systems, a variable relative delay between base stations (BS) may exist. Hence, the wireless communication systems may not be synchronized and the relative delay may vary in time, thus one BS may use different pilot sequences than another BS.

Synchronization methods may be used to synchronize a mobile station (MS) with the BS. The synchronization may be done by performing a search of the pilot signal and performing frequency acquisition. The search of the pilot signal may be done at a receiver. However, the receiver may receive signals that include desired pilot signal, undesired pilot signals and noise. Furthermore, the desired pilot signal and the undesired pilot signal may themselves include noise. Thus, misdetection or false alarms may occur. Misdetection may be the identification of an undesired pilot signal or noise signal as the desired pilot signal. A false alarm may be the rejection of the desired pilot signal. Furthermore, misdetection and false alarms may result in errors in the frequency acquisition process.

Thus, there is a continuing need for better ways to verify synchronization of the pilot signals and for frequency acquisition.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
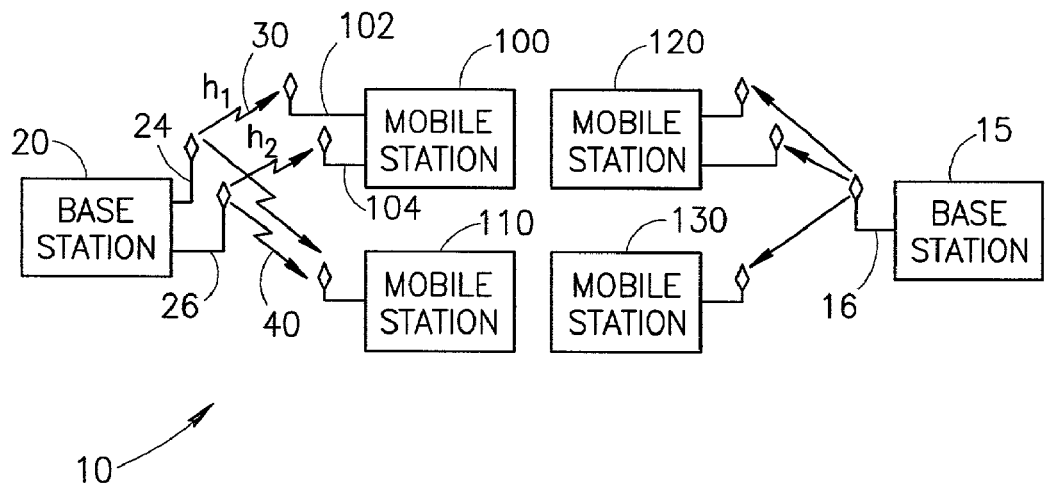
FIG. 1 is a block diagram of an example of a wireless communication system in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the signal processing arts to convey the substance of their work to others skilled in the art. Unless specifically stated otherwise, as apparent from the following discussions, it is appreciated that throughout the specification discussions utilizing terms such as "processing" "computing," "calculating," "determining," or the like, refer to the action and/or processes of a computer or computing system or similar electronic computing device that manipulates and/or transforms data represented as physical, such as electronic quantities within the computing system's registers and/or memories, into other data similarly represented as physical quantities within the computing system's memories, registers or other such information storage, transmission or display devices.

It should be understood that the present invention may be used in a variety of applications. Although the present invention is not limited in this respect, the circuits and techniques disclosed herein may be used in many apparatuses, such as mobile stations of a radio system. Mobile stations intended to be included within the scope of the present invention include, by a way of example only, cellular radiotelephone transceivers, two-way radio transceivers, digital system transceivers and the like.

Types of cellular radiotelephone transceivers intended to be within the scope of the present invention include, although are not limited to, Code Division Multiple Access (CDMA), CDMA-2000, wide band CDMA (WCDMA), cellular radiotelephone transceivers for transmitting and receiving spread spectrum signals and the like.

Turning to FIG. 1, a wireless communication system 10 in accordance with an embodiment of the invention is shown. The wireless communication system 10 may comprise one or more base stations 15, 20. For example, one of the base stations 15, 20 may include one or more antennas. The base station 20 may include two transmitters and two antennas 24 and 26, and the base station 15 may include one transmitter and one antenna 16. Although the scope of the present invention is not limited to this example, base station 15, may be adapted to transmit one pilot signal pattern and base station 20 may be adapted to transmit two or more pilot signal patterns from the at least two transmitters' antennas. Furthermore, base stations 20 and 15 may be included in a cellular communication system. However, it should be understood that other communication methods and systems for transferring voice and data may be used.

Additionally, the wireless communication system 10 may further include mobile stations 100, 110, 120, 130. As shown in FIG. 1, mobile stations 100 and 120 may include two antennas and mobile stations 110 and 130 may include one antenna. A wireless channel may exist between the base station's antenna and the mobile station's antenna. For example, a channel $h_1$ 30 may exist between the antenna 24 of base station 20 and antenna 102 of mobile station 100. A channel $h_2$ 40 may exist between the antenna 26 of base station 20 and antenna 104 of mobile station 100. A wireless channel may include several paths, one characterized by its gain and delay.

Figure 2:
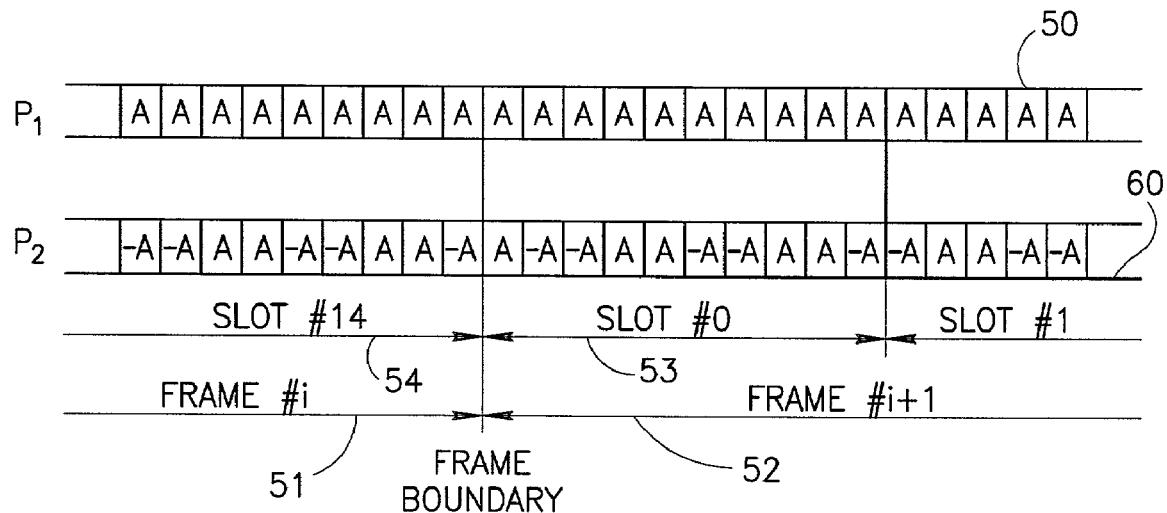
FIG. 2 is an illustration of a structure of pilot signal patterns in accordance with an embodiment of the invention.

Turning now to FIG. 2, an example of pilot signal patterns that may be used in a WCDMA cellular system is given. A pilot signal may comprise one or more pilot signal patterns. For example, base station 20 may transmit the pilot signal using pilot signal pattern 50 from antenna 24 and pilot signal pattern 60 from antenna 26. Furthermore, base station 15 may transmit one pilot signal pattern 50 from antenna 16. Pilot signal patterns 50,60 may include frames 51, 52. Frames may include 15 slots wherein "slot#0" 53 may be the first slot of frame 52 and "slot#14" 54 may be the last slot of frame 51. A slot may include 10 modulated symbols "±A", where A stands for A=1+j, and one modulated symbol may include 256 Chips. In addition, a base station may use a different chip sequence to distinguish it from the other base stations. This chip sequence may be termed "scrambling code." Although the example illustrated in FIG. 2 relates to a WCDMA cellular system, the present invention may also be used with any other pilot signal patterns.

Figure 3:
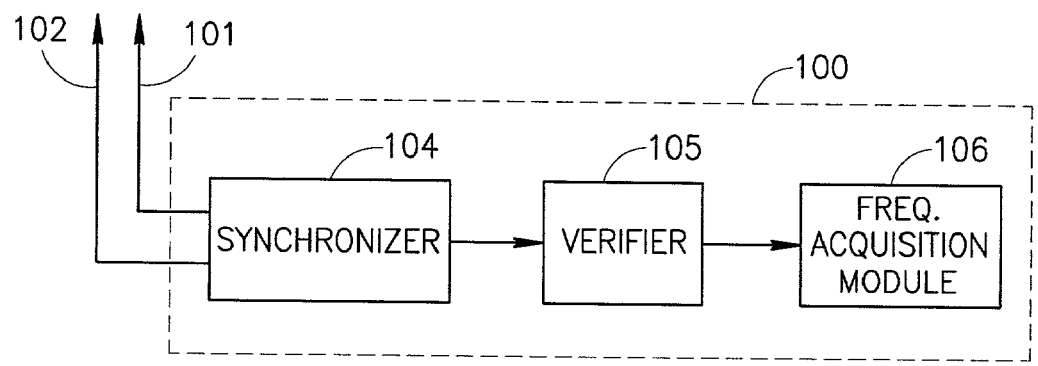
FIG. 3 is a block diagram of an embodiment of a mobile station in accordance with the invention.

Referring now to FIG. 3, a block diagram of an embodiment of the invention that may be used in at least one of the mobile stations 100, 110, 120 or 130 is shown, although, for simplicity, only the block diagram of the mobile station 100 will be described. The mobile station 100 may include an antenna 101 and an antenna 102 for receiving, for example, the pilot signal patterns 50, 60, a synchronizer 104, a verifier 105 and a frequency acquisition module 106.

In operation, the pilot signal patterns 50,60 may be received by antenna 101 and antenna 102. The synchronizer 104 may try to achieve synchronization of the symbols of the pilot signal that is transmitted from base station 20. While attempting to achieve synchronization of the symbols of the pilot signal, the synchronizer 104 may provide predictive synchronization hypotheses. The synchronizer 104 may also provide one of several candidates as a possible synchronization hypothesis at certain intervals. Thus, many false-alarm hypotheses might occur at the output of the synchronizer 104. The verifier 105 may verify the synchronization hypothesis provided by synchronizer 104. The verifier 105 may test the received signal during a time period and compare the quality of the received signal to certain criteria. Verifier 105 may verify the validity of the synchronization hypothesis and may provide verified symbols. Although the scope of the present invention is not limited in this respect, the frequency acquisition module 106 may attempt to synchronize the frequency of the mobile station with that of the base station using a validated synchronization hypothesis and the verified symbols. The verifier 105 may verify synchronization to two or more symbols of the pilot signal concurrently to a repetition of a frequency acquisition for verified symbols. Frequency acquisition module 106 may measure the frequency offset of the received pilot signal and adjust its frequency source until the frequency offset estimator becomes smaller than a convergence threshold for one or more repetitions.

A detailed description of the operation of verifier 105 and frequency acquisition module 106 will now be given. It should be understood that frequency acquisition module 106 may be bypassed for frequency offsets smaller than a predetermined threshold, in order to reduce the acquisition time. For example, bypassing frequency acquisition may be done on mobile station 100 handoff from a different system.

Figure 4:
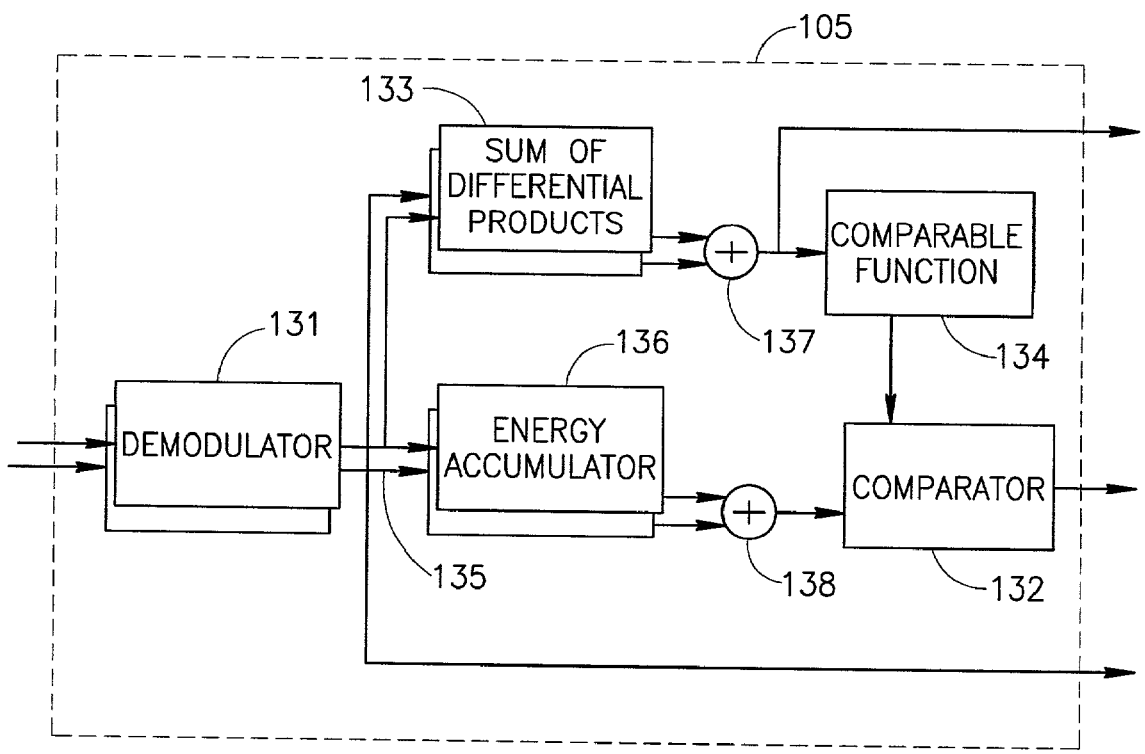
FIG. 4 is a block diagram of a verifier in accordance with an embodiment of the invention.

Turning now to FIG. 4, an embodiment of the verifier 105 in accordance with the invention is shown. Although the scope of the present invention is not limited to this embodiment, the verifier 105 may include a demodulator 131, a comparator 132, a sum of differential products calculator 133, a comparable function 134, an energy accumulator 136 and adders 137, 138.

Although the scope of the present invention is not limited in this respect, an embodiment of the present invention may comprise two or more receiving antennas, for example mobile station 100, and additional modules of the demodulator 131. The sum of differential products calculator 133 and the energy accumulator 136 may be provided for the receiving antenna. Adders 137, 138 may combine the signals of the sum of differential products 133 and of the energy accumulator 136, respectively. However, for simplicity, the description below will refer to an embodiment with one receiving antenna. The demodulator 131, the sum of differential product calculator 133 and the energy accumulator 136 may include one or more modules according to the number of the pilot signal patterns.

Although the scope of the present invention is not limited in this respect, the received pilot signal patterns 50,60 may be demodulated by demodulator 131. Demodulator 131 may be adapted, for example, to receive pilot signals of a WCDMA cellular system and output demodulated received symbols 135. In addition, demodulator 131 may include one or more despreaders matched to the spreading code of the base stations. The demodulated received symbols 135 may be given by equations 1a and 1b. Equation 1a is a general case for a base station with N antennas, and equation 1b is an example of a base station with two antennas. For simplicity, the example below will be given for the case of a base station with two antennas (base station 20) and a mobile station with one antenna (mobile station 110). However, the present invention is not limited to this example, and may be applicable to a base station and a mobile station with any number of antennas.

$$Rx(i) = \left(\sum_{k=1}^{N} p_k(i) \cdot h_k(i)\right) \cdot \text{sinc}(f_0 T) \cdot e^{-j\left(2\pi f_0 T\left(i-\frac{1}{2}\right)+\theta\right)} + n(i) \quad \text{Eq 1a}$$

$$Rx(i) = [p_1(i) \cdot h_1(i) + p_2(i) \cdot h_2(i)] \cdot \text{sinc}(f_0 T) \cdot e^{-j\left(2\pi f_0 T\left(i-\frac{1}{2}\right)+\theta\right)} + \quad \text{Eq. 1b}$$
$$n(i) = [h_i(i) + \text{sign}(p_2(i)) \cdot h_2(i)] \cdot A \cdot \sin$$
$$c(f_0 T) \cdot e^{-j\left(2\pi f_0 T\left(i-\frac{1}{2}\right)+\theta\right)} + n(i)$$

wherein $p_k$ is the pilot signal pattern transmitted from antenna k, T is the pilot symbol duration, the sinc gives the loss due to the rotation of the signal inside a symbol, the exponent shows the rotation of the whole signal from symbol to symbol, n is an equivalent noise term due to thermal noise, other cells, multipath or any other effect, i is a time index of the received demodulated symbol, $f_0$ is the relative frequency offset between the base station 20 and the mobile station 100, and θ may be an unknown constant phase.

The demodulated received symbols 135 may be inputted to a sum of differential products calculator 133. The sum of differential products calculator 133 may calculate for any two symbols, satisfying $\text{sign}(p_2(i))=\text{sign}(p_2(i+1))$, the following differential product:

$$Rx(i+1) \cdot Rx^*(i) = \quad \text{Eq. 2}$$
$$\{[h_1(i+1) + \text{sign}(p_2(i+1)) \cdot h_2(i+1)] \cdot A \cdot \text{sinc}(f_0 T) \cdot$$
$$e^{-j\left(2\pi f_0 T\left(i+\frac{1}{2}\right)+\theta\right)} + n(i+1)\}\cdot$$

$$\{[h_1^*(i) + \text{sign}(p_2(i)) \cdot h_2^*(i)] \cdot A^* \cdot \text{sinc}(f_0 T) \cdot e^{j(2\pi f_0 T(i-\frac{1}{2})-\theta)} + n^*(i)\} =$$
$$|h_1(i) + \text{sign}(p_2(i)) \cdot h_2(i)|^2 \cdot |A|^2 \cdot \text{sinc}^2(f_0 T) \cdot e^{-j(2\pi f_0 T)} + n(i)$$

wherein, since the channel varies slowly relative to the symbol rate, it may be assumed that h(i)=h(i+1). Furthermore, the sum of differential products calculator 133 may accumulate the above differential products to generate a sum of differential products of at least two demodulated symbols as is shown by equation 3.

$$M_1 = \sum_{\substack{i=1 \text{ such that} \\ \text{sign}(p_2(a))=\text{sign}(p_2(i+1))}}^{N-1} Rx(i+1) \cdot Rx^*(i) = \quad \text{Eq. 3}$$

$$|A|^2 \cdot \text{sinc}^2(f_0 T) \cdot e^{-j(2\pi f_0 T)} \cdot$$

$$\sum_{\substack{i=1 \text{ such that} \\ \text{sign}(p_2(i))=\text{sign}(p_2(i+1))}}^{N-1} |h_1(i) + \text{sign}(p_2(i)) \cdot h_2(i)|^2 +$$

$$\sum_{\substack{i=1 \text{ such that} \\ \text{sign}(p_2(i))=\text{sign}(p_2(i+1))}}^{N-1} n(i).$$

Although the scope of the present invention is not limited to this embodiment, when n transmission antennas are used, the index i used in equation 3 may, in one example, satisfy that $p_k(i)=p_k(i+1)$ for all the transmission antennas. In another example, the sum of differential products may be performed over pairs of received symbols over at least two consecutive time indexes (i,i+1), wherein the sum of differential products of the at least one pilot signal pattern may comprise substantially equal value for the first and second transmitted pilot pattern symbols.

The sum of differential products may be inputted to a comparable function 134. The comparable function 134 may generate a real comparable value out of the complex value of the sum of differential products. Although the scope of the present invention is not limited to this embodiment, the comparable function 134 may employ, for example, the real part of the sum of differential products, or the absolute value of the sum of differential products.

The comparator 132 may compare the comparable value, for example an absolute value, of a sum of differential products (equation 3) of at least two demodulated symbols of the pilot signal patterns 50, 60

$$\left| \sum_{\substack{i=1 \text{ such that} \\ \text{sign}(p_2(i))=\text{sign}(p_2(i+1))}}^{N-1} Rx(i+1) \cdot Rx^*(i) \right|$$

to an adaptive threshold. An example of the adaptive threshold that may depend upon the sum of energies of the demodulated received symbols may be given by $$\sum_{\substack{i=1 \text{ such that} \\ \text{sign}(p_2(i))=\text{sign}(p_2(i+1))}}^{N-1} |Rx(i)|^2 \cdot \text{Const}_1.$$

$\text{Const}_1$. However, in another embodiment of the present invention, a different energy estimator may be used, if desired.

The operation of the comparator 132 may be given by equation 4 below.

$$|M_1| = \left| \sum_{\substack{i=1 \text{ such that} \\ \text{sign}(p_2(i))=\text{sign}(p_2(i+1))}}^{N-1} Rx(i+1) \cdot Rx^*(i) \right| > \quad \text{Eq. 4}$$

$$\sum_{\substack{i=1 \text{ such that} \\ \text{sign}(p_2(i))=\text{sign}(p_2(i+1))}}^{N-1} |Rx(i)|^2 \cdot \text{Threshold}$$

The verifier 105 may verify the that hypothesis being tested is valid, if the left-hand side of Equation 4 is greater than its right-hand side, or the verifier 105 may disprove the hypothesis being tested.

Furthermore, the verifier 105 may be evaluated by its ability to reject non-valid hypotheses and by its ability not to reject valid hypotheses. The ability to reject non-valid hypotheses may be termed "false alarm probability," which may ideally be zero. The ability not to reject valid hypotheses may be termed "mis-detect probability", which may ideally be zero.

In the embodiments described herein, it should be understood that for a non-valid candidate coming out of the synchronizer 104 the random variables on both sides of equation 4 may be due to noise, Although it should be understood that the scope and application of the present invention is in no way limited to these examples, values of the $\text{Const}_1$ may be set to above 0.3 for a false alarm probability of less than 0.01. Additionally, a zero false alarm probability may cause higher mis-detect probability. Thus, the selected adaptive threshold value may be selected to balance the two probabilities.

Figure 5:
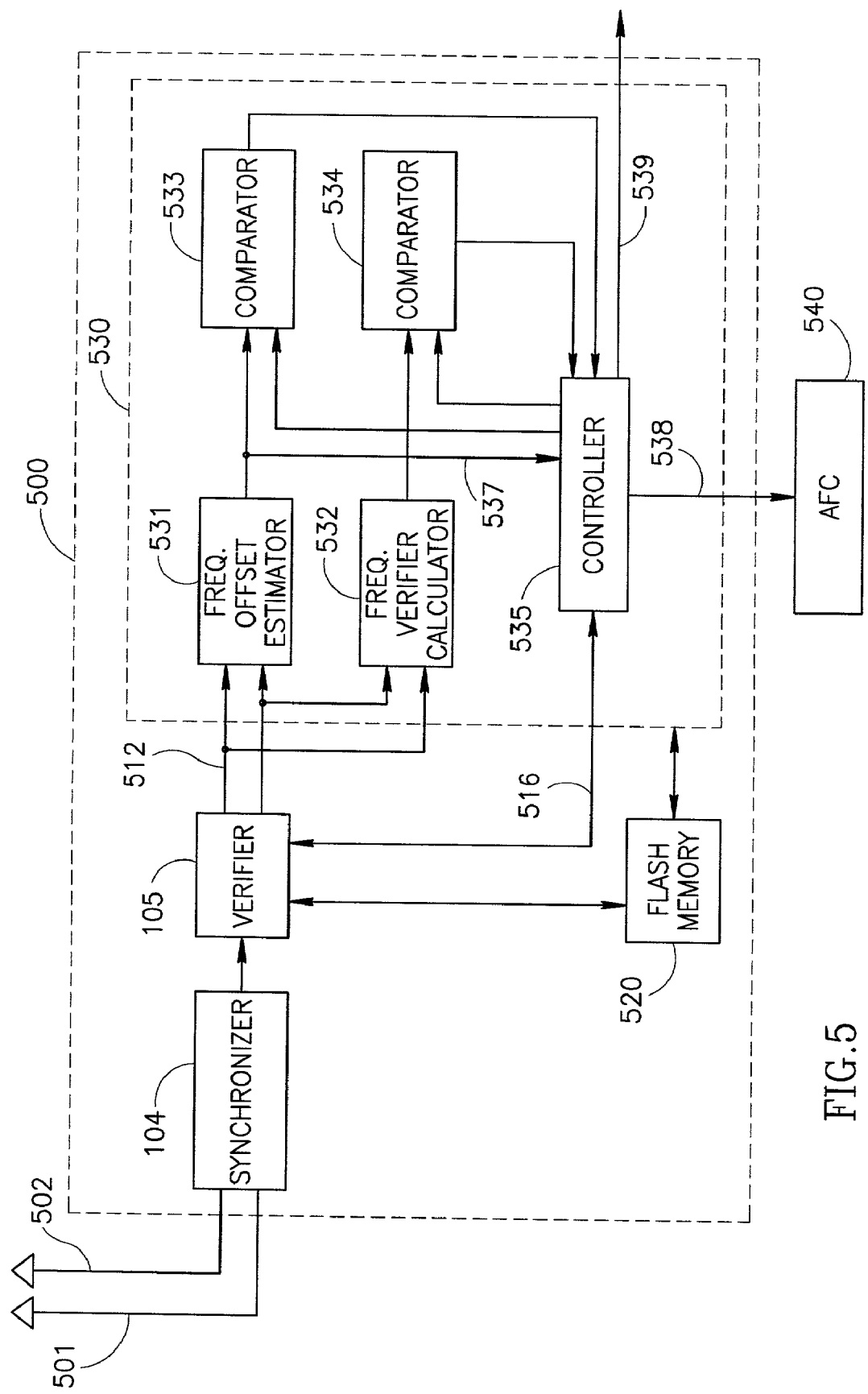
FIG. 5 is a block diagram of another embodiment of a mobile station in accordance with the present invention.

Referring now to FIG. 5, another embodiment of the invention is shown. Although the scope of the present invention is not limited in this respect, the embodiment 500 may be a mobile station of a WCDMA cellular communication system. The embodiment 500 may include an antenna 501, an antenna 502, a synchronizer 104, a verifier 105, a flash memory 520, a frequency acquisition module 530 and an automating frequency controller (AFC) 540.

Although the scope of the present invention is not limited in this respect, the frequency acquisition module 530 may be adapted to provide a frequency correction signal according to an evaluated frequency offset which is evaluated according to a sum of differential products of verified demodulated received symbols. The frequency acquisition module 530 may include a frequency offset estimator 531, a frequency verification calculator 532, a comparator 533, a comparator 534 and a controller 535.

In operation, the antennas 501 and 502 may receive, for example, pilot signal patterns 50 and 60 of FIG. 2. The synchronizer 104 and verifier 105 may synchronize and verify synchronization of pilot signal patterns 50, 60 by comparing a comparable value of a sum of differential products of at least one demodulated received symbol of the at least one pilot signal pattern 50, 60 to an adaptive threshold, as is shown in equation 4. An example of an operation of the same or similar synchronizer and verifier was described in detail with reference to FIG. 3 and FIG. 4 above. The verifier 105 may verify synchronization of the symbols of the pilot signal patterns 50, 60 concurrently with a repetition of a frequency acquisition by the frequency acquisition module 530.

Although the scope of this example is not limited in this respect, the flash memory 520 may be used to store the executable program of the controller 535, the verifier 105 and values and coefficients that may be used for calculations.

Although the scope of the present invention is not limited in this respect, the frequency acquisition module 530 may receive the sum of demodulated received symbols and the demodulated received symbols from the verifier 105. The frequency offset estimator 531 may estimate the frequency offset according to the sum of differential products of the demodulated received symbols received from the verifier 105, and may send a correction signal 537 to the controller 535, according to the estimated frequency offset which may be provided by frequency offset estimator 531. The controller 535 may command 538 the AFC 540 to decrease or increase the frequency. Furthermore, the controller 535 may control the frequency acquisition according to a set of rules.

Although the scope of the present invention is not limited to this example, the frequency acquisition module 530 may use a sampling frequency of 15000 Hz, and thus it may support frequency offsets of up to ±7500 Hz, The frequency acquisition module 530 may be split Into two operation modes: a transient mode and a steady state mode. For example, in the transient mode, there may be an assumption that the frequency offset is large (several kHz). Additionally, in the steady state mode, there may be an assumption that the frequency offset is small (less than 1 kHz). Although the scope of the present invention is not limited in this respect, in the transient mode, the frequency-offset estimator 531 may perform the differential metric of equation 3 and calculate the estimated frequency offset as shown with equation 5 below:

$$f_1^- = \frac{-1}{2\pi T} tg^{-1} \frac{Im\{M_1\}}{Re\{M_1\}}.$$  Eq. 5

This value may be sent as a correction signal 537 to the AFC 540.

Figure 6:
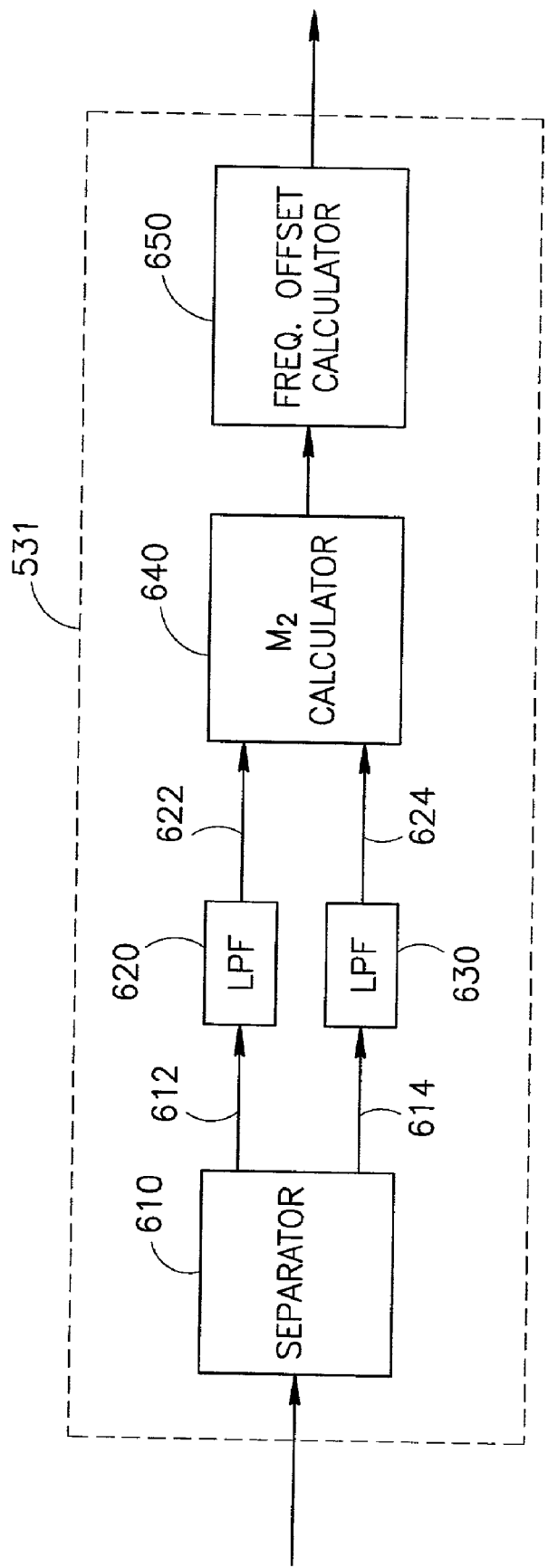
FIG. 6 is a block diagram of a frequency offset estimator of FIG. 5.

Referring to FIG. 6, a block diagram of the frequency offset estimator 531 in steady state mode according to an embodiment of the invention is shown. The frequency offset estimator 531 may include a separator 610, a low pass filter (LPF) 620, a LPF 630, A $M_2$ metric calculator 640 and a frequency offset calculator 650. Although the scope of the present invention is not limited in this respect, the separator 610 may separate the received signal into the two received sequences relating to the two pilot signal patterns transmitted from the first and second transmitting antennas. The separation is done according to the following equations (equation 6 and equation 7):

$$RxAnt1(i) = \{Rx(2i) + Rx(2i+1)\}/2 =$$  Eq. 6
$$A \cdot \operatorname{sinc}(f_0 T) \cdot e^{-j(2\pi f_0 T(2i)+\theta)} \cdot [h_1(2i) \cdot \cos(\pi f_0 T) +$$
$$\operatorname{sign}(p_2(2i)) \cdot h_2(2i) \cdot j \cdot \sin(\pi f_0 T)] + \frac{n(2i) + n(2i+1)}{2}$$

$$RxAnt2(i) = \{\operatorname{sign}(p_2(2i)) \cdot Rx(2i) + \operatorname{sign}(p_2(2i+1)) \cdot Rx(2i+1)\}/2 =$$  Eq. 7
$$A \cdot \operatorname{sinc}(f_0 T) \cdot e^{-j(2\pi f_0 T(2i)+\theta)} \cdot [h_2(2i) \cdot \cos(\pi f_0 T) +$$
$$\operatorname{sign}(p_2(2i)) \cdot h_1(2i) \cdot j \cdot \sin(\pi f_0 T)] +$$
$$\frac{\operatorname{sign}(p_2(2i)) \cdot n(2i) + \operatorname{sign}(p_2(2i+1)) \cdot n(2i+1)}{2}$$

i—is the symbol index within a frame, and $f_0$ is the residual frequency offset The indexes i in equation 6 and equation 7 are chosen such that equation 8 is fulfilled, $$\operatorname{sign}(p_2(2i)) = -\operatorname{sign}(p_2(2i+1))$$  Eq. 8

Although the scope of the present invention is not limited in this respect, a separation may be achieved if $|\sin(\pi f_0 T)| \ll 1$.

The two separated signals 612, 614 may be passed through LPF 620, 630 to reduce the noise power. The LPF 620, 630 may be, for example, an infinite impulse response (IIR) filter or a finite impulse response (FIR) filter. The filtered signals LpfOutput1 622 and LpfOutput2 624 at the output of LPF 620 and LPF 630 respectively may be inputted to the $M_2$ metric calculator 640. The $M_2$ metric calculator 640 may perform calculation according to equation 9 below.

$$M_2 = \sum_{i=1}^{N} LpfOutput1(i+1) \cdot LpfOutput1^*(i) +$$  Eq. 9
$$\sum_{i=1}^{N} LpfOutput2(i+1) \cdot LpfOutput2^*(i)$$

According to equation 9 the frequency offset calculator 650 may calculate its output as shown with equation 10 below:

$$f_2^- = \frac{-1}{4\pi T} tg^{-1} \frac{Im\{M_2\}}{Re\{M_2\}}.$$  Eq. 10

Turning back to FIG. 5, the controller 535 may receive the output of the frequency offset estimator 531. Furthermore, controller 535 may multiply the output of the frequency offset estimator 531 by a factor α and send the result of the multiplication to AFC 540. The factor α may trade off the convergence speed versus the final frequency offset variance. Although the present invention is not limited to this example, the selected values for the above parameters may be N=50 symbols, α=0.5.

Furthermore, the comparator 534 may receive from the frequency offset estimator 531 the real part of the sum of differential products of the demodulated received symbols from metric $M_1$ and may compare the real part of the sum of differential products, over one or more iterations of the frequency acquisition, to a verification threshold. This process may be repeated until the verification threshold is exceeded.

Figure 7:
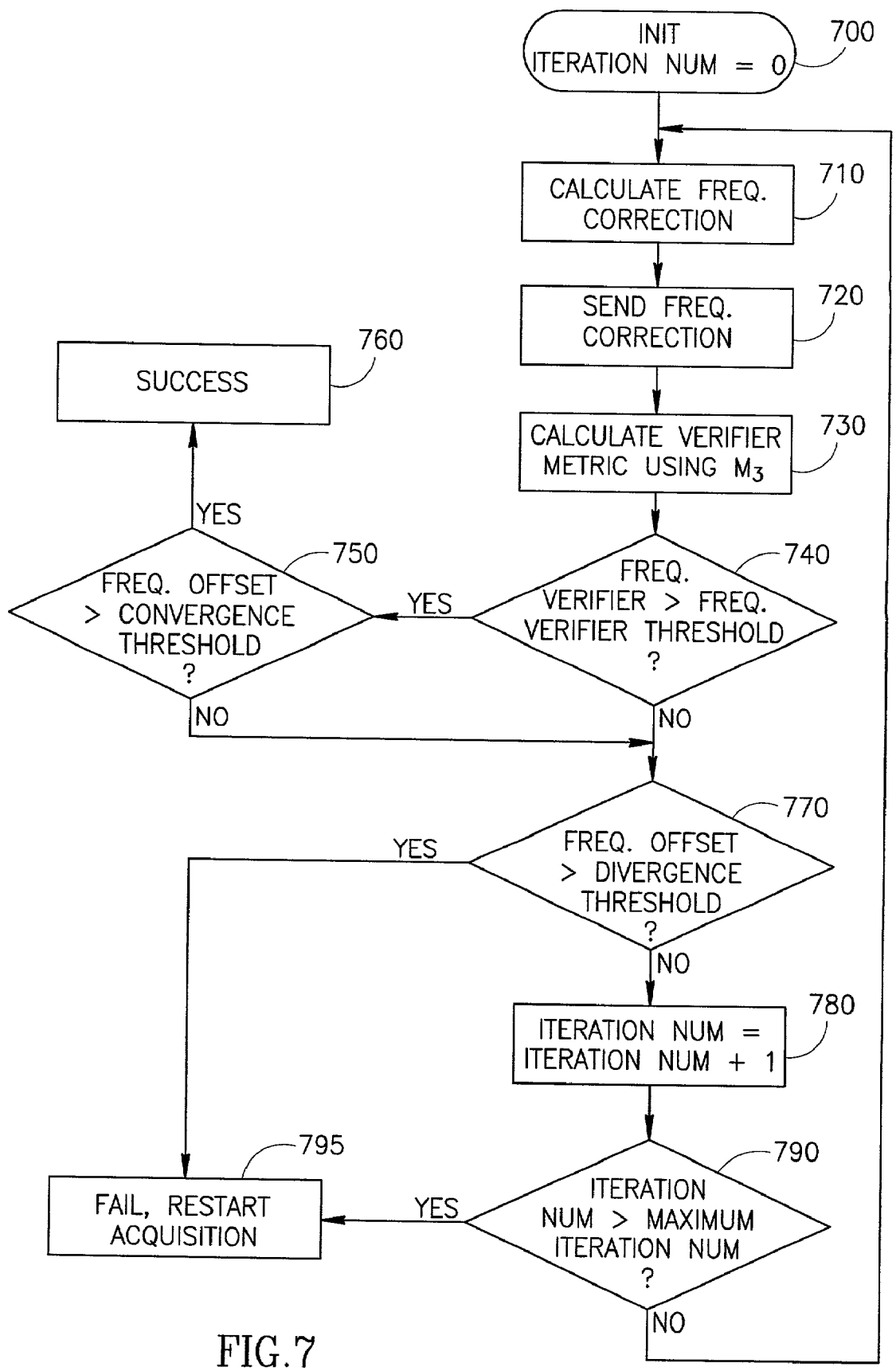
FIG. 7 is a flowchart of a frequency equation method that may be used in accordance with the invention.

Turning to FIG. 7, a method of frequency acquisition according to an embodiment of the present invention is shown. Although the present invention is not limited in this respect, the method may be employed by controller 535. Controller 535 may control the frequency acquisition process according to the following method. The method starts with an initiation of the number of the frequency acquisition iterations to zero, block 700. The next step may be calculating the frequency correction value (using $\hat{f}_1$ or $\hat{f}_2$, for transient mode and steady state mode respectively) block 710. Controller 535 may send the frequency correction value to AFC 540 via command line 538, block 720. Frequency verification calculator 532 may calculate the frequency verification metric, block 730. An example of such a metric is given below in equation 12. The frequency verification metric may be a sliding sum of a real part of the demodulated received symbols. Comparator 534 may process frequency verification by comparing, for example, the sliding sum of metric $M_3$ to frequency verification threshold, block 740. Although the scope of the present invention is not limited in this respect, this process may be depicted in equation 11 below:

$$M_3(k) = \frac{Real\{M_1(k)\}}{\sum_{\substack{i=kN+1 \text{ such that} \\ sign(p(i))=sign(p(i+1))}}^{kN+N-1} |Rx(i)|^2} = \qquad \text{Eq. 11}$$

$$\frac{\sum_{\substack{i=kN+1 \text{ such that} \\ sign(p(i))=sign(p(i+1))}}^{kN+N-1} Real\{Rx(i+1) \cdot Rx^*(i)\}}{\sum_{\substack{i=kN+1 \text{ such that} \\ sign(p(i))=sign(p(i+1))}}^{kN+N-1} |Rx(i)|^2} \quad k = 0, 1, 2, \ldots$$

Note that the real part of the differential metric $M_1$ may be used as is opposed to the absolute value taken in equation 4.

The frequency verification metric may be depicted in equation 12:

$$FrequencyVerifier(t) = \qquad \text{Eq. 12}$$
$$\sum_{k=i-N_{RA}}^{i} M_3(k) > FrequencyVerifierThreshold$$

Although the present invention is not limited in this respect, the selected parameter values may be $N_{RA}=3$ (sum over last 4 values) and FrequencyVerifierThreshold=1.0. If the criterion of equation 12 is met, then a second criterion may be tested (block 750) before the controller 535 may declare success (block 760) The second criterion may be that the frequency offset be smaller than a convergence threshold. The comparator 533 may compare the absolute value of the estimated frequency threshold to the convergence threshold. Furthermore, the controller 535 may repeat the frequency acquisition until the frequency offset becomes smaller than the convergence threshold. However, if the criteria above were not met, a third criterion may be tested, block 770. The controller 535 may test whether an estimated frequency error becomes larger than a frequency divergence threshold and provide a failure signal if the criterion is met (block 795). If the above criteria are not met, the controller 535 may count the number of the frequency acquisition iterations, by increasing a counter by one, as is shown with block 780. The controller 535 may allow $N_{MAX}$ iterations of frequency acquisition attempts before it declares failure, block 790. The controller 535 may provide a success signal for successfully completing frequency acquisition within a predefined number of iterations (760) and may provide a failure signal for frequency acquisition failure within a predefined number of iterations (795) of the frequency acquisition.

For simplicity, the description above was given for the case of a base station with two antennas, for example, base station 20, and a mobile station with one antenna, for example, mobile station 110. However, the present invention is not limited to this example and may be applicable to a base station and a mobile station with any number of antennas.

While certain features of the invention have been illustrated and described herein, many modifications, substitutions, changes, and equivalents will now occur to those skilled in the art. It is, therefore to be understood that the appended claims are intended to cover all such modifications and changes as fall within the true spirit of the invention.

The invention claimed is:

1. A method comprising:
   verifying synchronization of a first and a second demodulated received symbols of a pilot signal pattern during a frequency acquisition by comparing a sliding sum of a real part of a sum of differential products of the first and second demodulated received symbols over one or more iterations of the frequency acquisition to an adaptive threshold which includes a metric of verification threshold values; and
   repeating acquisitioning the frequency until the adaptive threshold is exceeded.

2. The method of claim 1, further comprising:
   adapting the adaptive threshold according to a sum of energies of the first and the second demodulated received symbols.

3. The method of claim 1, further comprising:
   transmitting the pilot signal pattern by a transmitting antenna; and
   receiving the pilot signal pattern by a receiving antenna.

4. The method of claim 3, further comprising:
   transmitting two pilot signal patterns by two transmitting antennas; and
   receiving the two pilot signal patterns by the receiving antenna.

5. The method of claim 1, further comprising:
   calculating the sum of differential product over pairs of consecutive demodulated received symbols, wherein the differential products of the transmitted pilot signal at a first time index and at a second consecutive time index of the demodulated received symbols comprise substantially equal values for the pilot signal pattern.

6. The method of claim 1, wherein verifying synchronization further comprises:
   comparing an absolute value of the sum of differential products of the first and the second demodulated received symbols to the adaptive threshold.

7. The method of claim 1, wherein acquisitioning the frequency comprises:
   estimating a frequency offset according to a sum of differential products of verified demodulated received symbols; and
   adjusting a frequency according to the estimated frequency offset.

8. The method of claim 7, wherein acquisitioning the frequency further comprises:

repeating acquisitioning the frequency until the frequency offset becomes smaller than a convergence threshold fox one or more repetitions.

9. The method of claim 8, wherein acquisitioning the frequency further comprises:

aborting acquisitioning the frequency when an estimated frequency error becomes larger than a frequency divergence threshold for one or more repetitions.

10. A wireless communication system comprising:

a base station having two antennas wherein the base station is adapted to transmit two pilot signal patterns;

a mobile station adapted to verify synchronization of a first and a second demodulated received symbols of a pilot signal pattern during a frequency acquisition by comparing a sliding sum of a real part of differential products of the first and second demodulated received symbols over one or more iterations of the freguency acquisition to an adaptive threshold which includes a metric of verification threshold values; and repeating acquisitioning the frequency until the adaptive threshold exceeded.

11. The wireless communication system of claim 10, wherein the mobile station further comprises:

an energy accumulator to adjust the adaptive threshold according to the sum of energies of the demodulated received symbols.

12. The wireless communication system of claim 10, wherein the mobile station further comprises:

a frequency acquisition module to provide a frequency correction signal according to an estimated frequency offset.

13. A wireless communication device comprising:

a verifier to verify synchronization to a pilot signal pattern by comparing a real part of a sum of differential products of a demodulated received symbols over two or more iterations of a frequency acquisition to an adaptive threshold which includes a metric of verification threshold values, and repeating the frequency acquisition until the adaptive threshold is exceeded; and a flash memory device operably coupled to the verifier.

14. The wireless communication device of claim 13, comprising:

an energy accumulator to adjust the adaptive threshold according to the sum of energies of the demodulated received symbols.

15. The wireless communication device of claim 14, wherein the pilot signal pattern comprises two pilot signal patterns.

16. The wireless communication device of claim 13, comprising:

a frequency acquisition module to provide a frequency correction signal according to an estimated frequency offset estimated according to a sum of differential products of a verified demodulated received symbol.

17. An apparatus comprising:

a frequency offset estimator to estimate an offset frequency according to a first differential metric at a transient mode and adapted to estimate the offset frequency according to a second differential metric at a steady state mode;

a frequency verification calculator to calculate a sliding sum of a real part of demodulated received symbols; and a controller to provide a frequency correction signal according to the estimated frequency offset.

18. The apparatus of claim 17, further comprising:

a first comparator to compare the estimated frequency offset to a convergence threshold; and wherein the controller is adapted to repeat a frequency acquisition until the frequency offset becomes smaller than the convergence threshold.

19. The apparatus of claim 18, further comprising:

a second comparator to compare the sliding sum of real part of demodulated received symbols to frequency verification threshold ; and wherein the controller is adapted to repeat the frequency acquisition until the sliding sum exceeds the frequency verification threshold.

20. An article comprising a storage medium having stored thereon instructions, that, when executed by a computing platform, results in:

comparing a real part of the sum differential products of demodulated received symbols over two iterations of a frequency acquisition to a metric of verification threshold values; and repeating the frequency acquisition until threshold is exceeded.

21. The article of claim 20, wherein the instructions further result in:

repeating the frequency acquisition until the frequency offset becomes smaller than a convergence threshold.

22. The article of claim 21, wherein the instructions further result in:

aborting the frequency acquisition when an estimated frequency error becomes larger than a frequency divergence threshold.

23. The article of claim 22, wherein the instructions further result in:

estimating a frequency offset according to a sum of differential product of a verified demodulated received symbols; and correcting a frequency according to an estimated frequency offset.

* * * * *